United States Patent [19]
Foldes

[11] 3,827,051
[45] July 30, 1974

[54] ADJUSTABLE POLARIZATION ANTENNA SYSTEM

[75] Inventor: Peter Foldes, Montreal, Quebec, Canada

[73] Assignee: RCA Corporation, New York, N.Y.

[22] Filed: Feb. 5, 1973

[21] Appl. No.: 329,620

[52] U.S. Cl. ............ 343/176, 333/11, 343/100 PE, 343/854, 343/858
[51] Int. Cl. ........................ H04i 5/00, H01q 3/26
[58] Field of Search...... 343/756, 853, 858, 100 PE, 343/176; 333/11

[56] References Cited
UNITED STATES PATENTS
3,742,506 6/1973 Wilkinson .......................... 343/858

*Primary Examiner*—Eli Lieberman
*Attorney, Agent, or Firm*—Edward J. Norton; Robert L. Troike

[57] ABSTRACT

An adjustable polarization system is provided by the combination of an adjustable power divider and an orthogonal coupler. One terminal of the power divider is coupled to one terminal of the orthogonal coupler through a 90° polarization rotator, the second terminal of the power divider being coupled to a second terminal of the orthogonal coupler. By an adjustment in the power divider, the percentage of power to the input terminals of the orthogonal coupler are altered and consequently the polarization is adjusted.

11 Claims, 7 Drawing Figures

ADJUSTABLE POLARIZATION ANTENNA SYSTEM

BACKGROUND OF THE INVENTION

This invention relates to a polarization system and more particularly to a polarization rotation system which permits independently rotatable transmit and receive polarizations for spectrum reuse antenna systems.

The reuse of frequency spectrum based on two orthogonal polarizations is vitally dependent on the achievable isolation at the receiving antenna between these polarizations. If the orthogonality of the two polarizations (perpendicularity in the case of linear polarizations and perfectly left and right-hand circular polarizations in the case of circular polarization) is ideal at the transmit end and no cross polarized component is generated by the media of propagation, then the available isolation at the receive antenna depends on the cross polarized level (axial ratio) of the receive antenna and the perfectness of alignment of the polarization with the incoming wave.

In a two-way communication system, usually the same antenna at different frequencies is used for receive and transmit communications. Since the polarization attitude for these two frequencies are generally different, perfect polarization matching requires separate polarization alignment for the two frequencies. This, for instance, can be done by simultaneously minimizing the cross polarized power levels at each receiving end of the above-described communications link.

In satellite communications, however, such a technique is not convenient, since it requires polarization alignment not only at the earth station but also at the satellite. The complexity of the spaceborne equipment for such purpose can be avoided if the receive and the transmit polarizations are adjustable simultaneously at the earth station. When the propagation media is not affecting the polarization attitude of the up and down link waves, such alignment can be easily arranged. This can be done by locking the receive and transmit polarizations together at the earth station antenna in the same way as at the satellite antenna and then rotating these polarizations by physical or electrical means until ideal polarization alignment is achieved.

If the propagating media affects the polarization attitude of the up and down link waves differently, as it is for instance in the practical case due to Faraday rotation through the ionosphere, the two polarizations have to be rotated independently for perfect alignment of the communication system. Such alignment is not possible by simple physical rotation (or equivalent) of the antenna and a radio frequency circuit is required which rotates the polarization separately for the up and down link, which at the same time represent different frequency bands.

The present invention provides a system in which the polarization attitudes may be independently rotated while maintaining a very high degree of polarization purity and isolation as the rotation of the polarization takes place.

BRIEF DESCRIPTION OF THE INVENTION

Briefly, an adjustable polarization system includes an orthogonal coupler having two input terminals and an output terminal. The first terminal is adapted to pass signals only of a first attitude and the second terminal is adapted to pass only signals at a second orthogonal attitude. The third terminal is adapted to pass signals at either attitude or combination thereof. An adjustable power divider is coupled to a source of signals for providing a selected percentage of the signals from the source to a first output terminal and the remaining power from the source to a second output terminal. The output at the first terminal of the power divider is coupled to the first terminal of the orthogonal coupler and the second terminal of the power divider is coupled through a 90° polarization rotator to the second terminal of the orthogonal coupler. By means of an adjustable member in the power divider, the percentage of power at the first and second output terminals thereof is adjusted to thereby cause changes in the resultant orientation of signals at the output of the orthogonal coupler.

The above-described adjustable polarization system is suitable for use in a dual-polarized antenna system. In such a case the adjustable power divider has two input terminals and two output terminals. The input terminals, as well as the output terminals, are essentially decoupled from each other by means of a particular combination of four short slot hybrids. A wave entering at the first input terminal of an adjustable power divider leaves the output terminal of an orthogonal coupler coupled to the power divider with one specific polarization attitude. This polarization attitude is dependent on the power division in the power divider. A wave entering at the second input terminal of the adjustable power divider leaves the output of the orthogonal coupler with orthogonal polarization to that of the first wave. When the power division is adjusted, the two polarizations are rotated together while maintaining their polarization orthogonality.

The above-described adjustable polarization system can be used in a dual frequency band, dual polarization spectrum reuse antenna system. In such a dual frequency band spectrum reuse system, two power dividers are used with two inputs to each of the power dividers. One of the power dividers is used for two orthogonal transmitter signal waves and the other power divider is used for two orthogonal receiver signal waves. One of the outputs of each of the power dividers is coupled through a duplexer to one terminal of an orthogonal coupler. The remaining output of each of the power dividers is coupled through a second duplexer and a 90° rotator to a second terminal of the orthogonal coupler. Separation between transmit and receive signal waves is done on the basis of frequency by the duplexers. Since the transmit and receive waves are coupled to separate power dividers, these transmit and receive waves may be independently rotated. The power dividers may be further arranged so that signal waves coupled to one input terminal of the power divider produce a first ratio of powers at the two output terminals and so that the signal waves coupled to the second input terminal of the power divider provide a second ratio of power at the two output terminals that is the reciprocal of the first ratio. Since one of these terminals undergoes an additional 90° rotation before being coupled to the orthogonal coupler, the two signals coupled to the same power dividers are maintained orthogonal to each other permitting spectrum reuse with good isolation.

DETAILED DESCRIPTION

A more detailed description follows in conjunction with the following drawings wherein.

Figure 1:
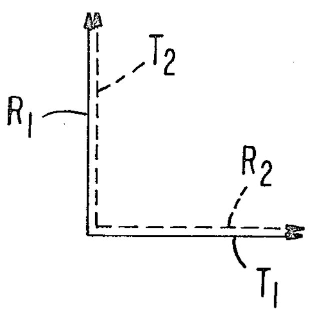
FIG. 1 is a vector diagram illustrating the orientation of linearly polarized waves in a typical dual frequency band, dual polarization spectrum reuse system.
Figure 2:
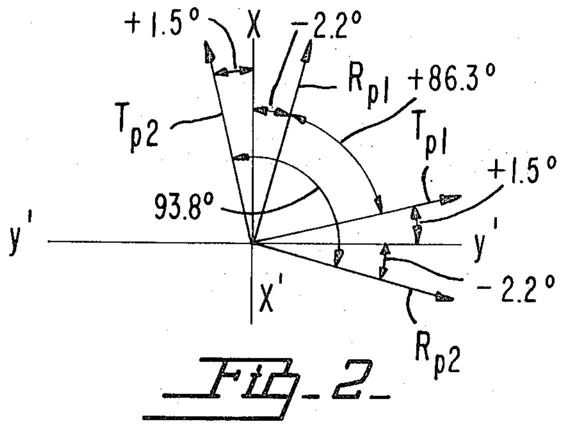
FIG. 2 is a vector diagram illustrating the typical phase shift changes due to propagation through the ionosphere.

In a dual frequency, dual polarization spectrum reuse system, the two transmit signal waves are transmitted orthogonal to each other. In the case of linear polarized waves, one of the transmitted signals is transmitted to the horizontal plane at a first frequency ($F_1$) as indicated by arrow T1 in FIG. 1. The other transmitted wave is transmitted at the same ($F_1$) frequency in the vertical plane as indicated by dashed arrow T2. Similarly, one of the received signal waves is at frequency $F_2$ in the vertical plane as indicated by arrow $R_1$ in FIG. 1. The other received signal wave is in the orthogonal horizontal plane as indicated by dashed arrow $R_2$ in FIG. 1. If no relative propagation differences occurred between transmit and received waves this orthogonal relationship would continue and alignment for transmit signal waves would automatically align the receive wave orthogonal thereto. However, due to the propagation media the propagation characteristics change and they change several times a day. In a typical up and down communication link between an earth station and a satellite, the polarization of the transmitted waves at 6 GHz may undergo a +1.5° attitude rotation from the positions in FIG. 1 and the polarization of the received wave at 4 GHz may undergo a −2.2° attitude rotation relative to these positions in FIG. 1. As shown in FIG. 2, arrows $T_{p1}$ and $T_{p2}$ indicate respectively the new orientation of the transmitted signal waves $T_1$ and $T_2$ at a remote satellite, for example. Arrows $R_{p1}$ and $R_{p2}$ indicate respectively the new orientations of the received signals $R_1$ and $R_2$ from the satellite. The two transmit signal waves and the two received signal waves remain at their orthogonal relative positions but orthogonal. The polarization of the received wave $R_{p1}$ is 86.3° from the polarization of the transmit wave $T_{p1}$. The polarization of the receive wave $R_{p2}$ is 93.8° from the polariation of the transmit wave $T_{p2}$. Alignment of either transmitted wave does not automatically align the received wave. In order to achieve this spectrum reuse a means must be provided for independently rotating the transmit and receive waves and to do so without upsetting the orthogonal relationships between the two received signal waves and the two transmitted signal waves.

Figure 3:
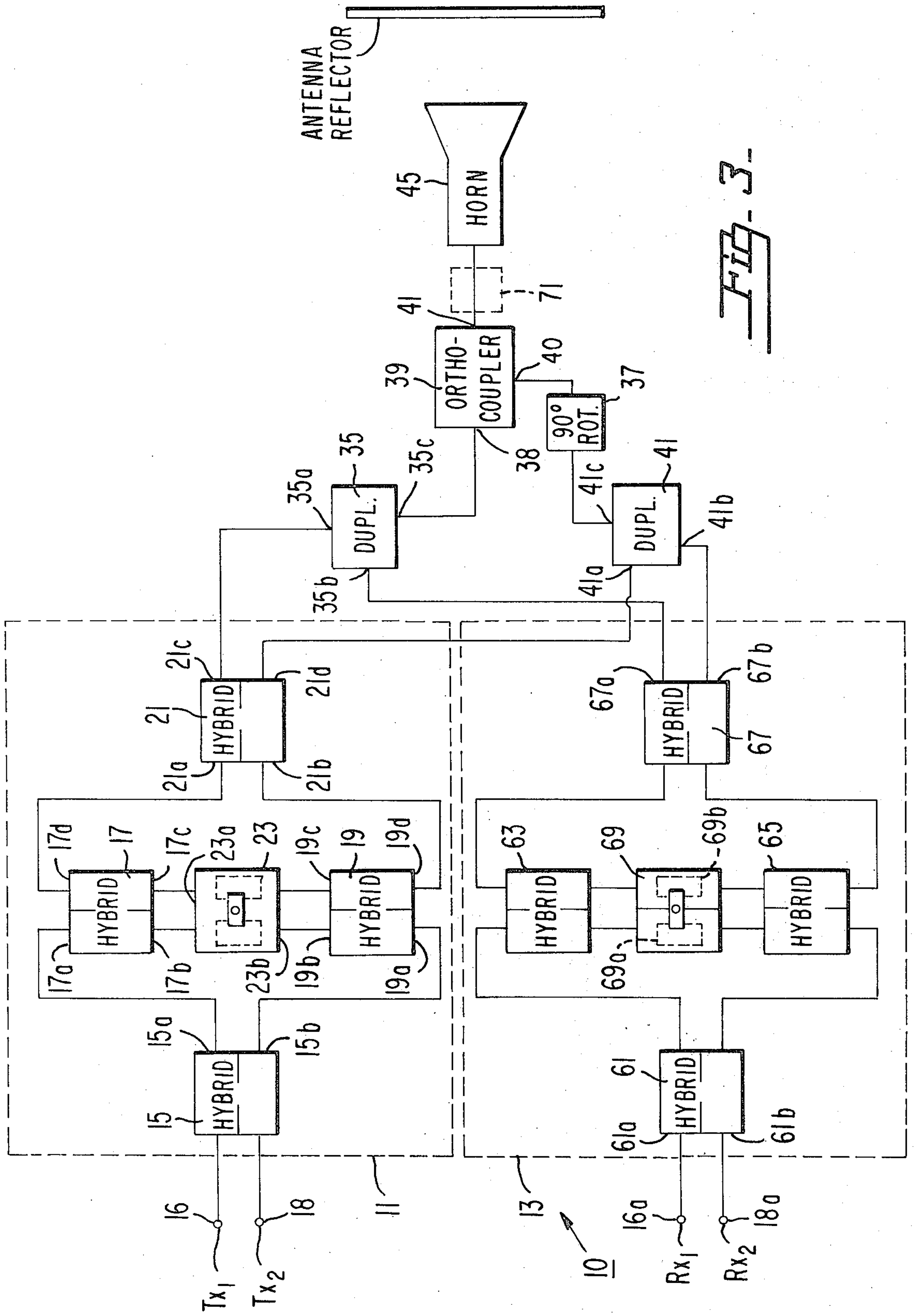
FIG. 3 is a block diagram of an independently rotatable transmit and receive polarization system.

Referring to FIG. 3, there is illustrated a system for accomplishing the above independent rotations while maintaining a very high degree of polarization purity. The overall system 10 in FIG. 3 includes a transmit adjustable polarization rotator system 11 and a receive polarization rotation system 13. The transmit polarization rotation system is comprised of short slot quadrature hybrids 15, 17, 19, 21 and adjustable plunger system 23. Short slot hybrid sections 15, 17, 19 and 21 are each typical short slot hybrids which for input at one arm provide an output of equal power but 90° relative phase shift at two output arms at the opposite end. The adjustable double plunger system 23 is shown in more detail in FIG. 4. The adjustable double plunger system 23 is made up of two waveguide sections 25 and 26 having a common side wall 29 between opposite side walls 27 and 28, top walls **29*a* and 29*b* (partly shown) and bottom walls 30*a* and 30*b*. Placed within each separate waveguide section 25 and 26 is a plunger 25*a* and 26*a*. The plungers 25*a* and 26*a* are slidable together within the waveguide sections 25 and 26. They are adapted to reflect a short at their opposite ends 25*b* and 25*c* and 26*b* and 26*c*. To present a complete short at these ends, grooves 31 are cut near the end of each of the plungers 25*a* and 26*a*. These grooves 31 are each made so as to form a slot length between the end of the plunger and the shorting end of the groove 31 that is one half wavelength at an operating frequency of the system to present a reflected short across the reflecting ends of each of the plungers. The plungers 25*a* and 26*a* may be slidable along the length of the waveguide sections by, for example, a vertical pin member extending through each of the waveguide sections 25 and 26 at the center of the top walls 29*a* and 29*b*. The pin members are coupled to each other outside the waveguide sections and are coupled to the plungers 25*a* and 26*a* inside the sections. A slot in the top walls 29*a* and 29*b* will permit the pin members to move in one direction toward one of the hybrids 19 or the other hybrid 17. These plungers 25*a* and 26*a*** are coupled to each other to move with each other to achieve identical phase shift.

Figure 4:
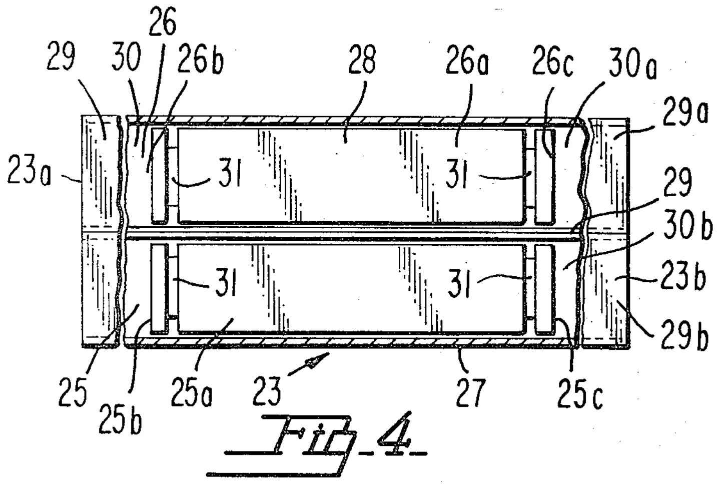
FIG. 4 is a sketch in plan view of an adjustable double plunger with a portion of the top walls of the waveguide removed for illustration.

Referring to FIGS. 3 and 4, the input of the first short slot hybrid 15 is coupled at terminal 16 to a first transmitter source $Tx_1$. The signals at terminal **15*a* of hybrid 15 are coupled to terminal 17*a* of hybrid 17. Terminal 15*b* of hybrid 15 is coupled to terminal 19*a* of hybrid 19. Terminal 19*b* of hybrid 19 is coupled to end 23*b* of waveguide section 25 of double plunger system 23. Terminal 19*c* of hybrid 19 is coupled to end 23*b* of waveguide section 26 of plunger system 23. The terminal 17*b* of hybrid 17 is coupled to end 23*a* of waveguide section 25 of plunger system 23. The end 23*a* of waveguide section 26 is coupled to terminal 17*c* of hybrid 17. The terminals 17*d* and 19*d* of the hybrids 17 and 19 are coupled respectively to terminals 21*a* and 21*b* of hybrid 21.**

In the operation of the adjustable power divider 11, transmitter $Tx_1$ signals applied at terminal 16 are equally power divided at hybrid 15 and applied to terminals **15*a* and 15*b* of hybrid 15 with those signals at the output of 15*b* being shifted 90° relative to those at the output of 15*a*. The signals at terminal 15*a* are coupled to hybrid 17 at terminal 17*a* and are equally power divided with the half power signals at terminal 17*c* undergoing an additional 90° phase shift than those signals at terminal 17*b*.** The signals at the output terminals 17*b* and 17*c* of hybrid 17 are then coupled to the adjustable double plunger system 23 at end 23*a*. Signals are reflected at the double plunger system 23 with equal phase shift back into the hybrid 17 at terminals 17*b* and 17*c* wherein they are recombined in phase and the total signal applied to hybrid 17 is coupled out of terminal 17*d* to terminal 21*a* of hybrid 21. Similarly, the 90° phase shifted signal from transmitter $Tx_1$ at the terminal 15*b* of hybrid 15 is coupled to terminal 19*a* of hybrid 19 and is power divided with 90° additional phase shift to those signals at terminal 19*c*. The output at terminals 19*b* and 19*c* is coupled to the adjustable double plunger system 23 at end 23*b*. The half power signals are reflected at the double plunger system 23 back to the respective arms 19*b* and 19*c* of hybrid 19 with equal phase shift. The reflected half power signals are coupled and add up in phase at terminal 19*d* so the total power reflected is coupled out of terminal 19*d* to terminal 21*b* of hybrid 21. The percentage of power output at terminals 21*c* and 21*d* is dependent upon the position of the plungers 25*a* and 26*a* within the adjustable plunger system 23. If the plungers 25*a* and 26*a* are in their centered position, the signals coupled into and out of the adjustable plunger system 23 at both ends 23*a* and 23*b* thereof undergo equal phase shift and therefore the relative phase between the signals coupled to terminals 21*a* and 21*b* as a result of an input signal at terminal 16 are 90° so that the total power adds up in phase and is coupled out at terminal 21*d* of hybrid 21. If the two plungers 25*a* and 26*a* in the plunger system 23 are moved by an electrical distance $+\alpha$ away from one end 23*a* of the waveguide sections 25 and 26, the two plungers are moved $\alpha$ distance toward the opposite end 23*b* of the double plunger system 23. By moving the plungers 25*a* and 26*a* the electrical distance $+\alpha$ away from the end 23*a*, an additional phase shift of $+\theta$ degrees is added to signals coupled to end 23*a* and a $-\theta$ degree phase shift occurs to signals coupled to end 23*b*. By movement of the plungers 25*a* and 26*a* $2\theta$ degrees relative phase shift is therefore provided. If, for example, the plungers 25*a* and 26*a* are moved so that the path length from terminal 15*a* to terminal 21*a* undergoes an additional phase shift of 180° relative to the path length from terminal 15*b* to terminal 21*b*, the total output would be reversed and the total power at terminal 16 would be coupled out of terminal 21*c* with no output at terminal 21*d*. This 180° phase difference can be accomplished by moving the plungers 25*a* and 26*a* toward hybrid 19 so that 90° less phase shift occurs in the path length between terminals 15*b* and 21*b*. It can be seen, therefore, by movement of the plungers 25*a* and 26*a* (which are moved together) one can change the ratio of the output power at the two output terminals 21*c* and 21*d* between these two extremes. In practical use these plungers are moved only slightly to achieve only a small percentage change of power at the output terminals.

Signals from a second transmitter $Tx_2$ may be coupled to terminal 18 of hybrid 15. If these plungers are again centered as in the first case, the total $Tx_2$ transmitter power through the device is coupled out of terminal 21*c* of hybrid 21 in a manner similar to that described above in connection with transmitter $Tx_1$ power. Thus, when the plungers are centered and one transmitter source $Tx_1$ is coupled to terminal 16 and a second transmitter source $Tx_2$ is coupled to terminal 18, these signals remain separated with all the transmitter $Tx_1$ power coupled out of terminal 21*d* and all the transmitter $Tx_2$ power coupled out of terminal 21*c*.

The output from terminal 21*c* of hybrid 21 is coupled via duplexer 35 to the first terminal 38 of an orthogonal coupler 39. The output from terminal 21*d* is coupled via duplexer 41 and 90° rotator 37 to terminal 40 of orthogonal coupler 39. The orthogonal coupler 39 at terminal 38 is adapted to pass only those signals in a vertical linear polarization. The terminal 40 of orthogonal coupler 39 is adapted to pass only horizontally polarized signals. The 90° rotator 37 rotates the attitude of the normally vertically polarized signals from duplexer 41 and converts them to horizontally polarized waves at its output to orthogonal coupler 39. The transmitter signals from terminal 21*d* are therefore converted by means of the rotator 37 to horizontally polarized signals at terminal 41 in the orthogonal coupler 39. The orthogonal coupler 39 may be in a waveguide system like that shown in FIG. 8 and described in connection therewith in U.S. Pat. No. 3,569,870. In this case, terminals 70 and 72 in the referenced patent correspond with terminals 38 and 40 and each terminal is used for both transmit and receive signals. The 90° polarization rotation achieved by section 37 may simply be provided by the coupling to terminal 72 in FIG. 8 of the reference using a twisted section of waveguide.

In the operation of the system with the adjustable plungers 25*a* and 26*a* in the centered position, the transmitted signals from transmitter source $Tx_2$ coupled to terminal 18 are coupled via duplexer 35 to terminal 38 of the orthogonal coupler 39. The coupled $Tx_2$ power output from the orthogonal coupler 39 is vertically polarized waves. The vertical polarized $Tx_2$ wave output at terminal 41 of coupler 39 is applied to horn 45 and these signal waves are radiated from the horn with the vertical polarization. This is represented in FIG. 1 by vector arrow T2. With the plungers still centered, the signals from transmitter source $Tx_1$ coupled to terminal 16 are coupled out of terminal 21*d* of hybrid 21 and are coupled to terminal 40 of orthogonal coupler 39 via 90° rotator with the waves horizontally polarized. Therefore, the output at terminal 41 from the orthogonal coupler 39 representing the power from transmitter $Tx_1$ is applied with horizontal polarization through horn 45. This is represented in FIG. 1 by vector arrow T1. These two transmitters may operate at the same $F_1$ frequency, for example at 6 GHz. Due to their orthogonal polarization, these signals remain substantially isolated.

Figure 5:
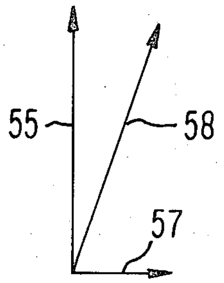
FIG. 5 is a vector diagram illustrating linear polarization rotation.

As stated previously, when the plungers are moved the ratio of power at the output terminals 21*d* and 21*c* is changed. When a certain ratio of power levels exists for each signal and these relative power levels are coupled to terminals 38 and 40 of the orthogonal coupler, the orientation of the linear polarized wave is a vector addition of the power levels of the two signals coupled to the coupler 39. For example, in FIG. 5 is the majority of the power of the transmitted signals is at vertical coupling terminal 38 of the orthogonal coupler 39 as represented by vector arrow 55 and a small percentage of the transmitted signal power is at the horizontal coupling terminal 40 as represented by vector arrow 57, the resultant polarization attitude is indicated by the resultant vector arrow 58. In this manner by changing the position of the plungers 25*a* and 26*a* in the adjustable plunger system 23, the percentage of power at the two terminals 38 and 40 changes and the orientation of the linearly polarized wave changes. This changing of plunger position and resultant polarization attitude change is done so that the polarization may be rotated for perfect alignment in the communication system. This adjustment of the plunger position to effect polarization attitude changes would be made as the propagating media changes significantly and effects the polarization attitude of the up and down links.

When the plungers 25a and 26a are moved together to provide a given rotation of one of the transmitter signal waves from one of the transmitters (transmitter $Tx_2$, for example) the ratios of power levels at the two outputs of hybrid 21 associated with the signal waves from the other transmitter (transmitter $Tx_1$) is the reciprocal in all cases. Therefore, when one polarization attitude is rotated slightly off the vertical, for example, the horizontally polarized wave is also rotated slightly off the horizontal and the relative polarization attitude of the two transmitter signal waves remains orthogonal or at 90°.

A second adjustable power divider 13 is provided for the receivers. The receiver $Rx_1$, for example, is coupled via terminal 16a to terminal 61a of hybrid 61 and a second receiver $Rx_2$ is coupled via terminal 18a to terminal 61b of hybrid 61. The adjustable power divider 13 further includes short slot quadrature hybrids 63, 65 and 67 and includes an adjustable double plunger system 69. The hybrids 61, 63, 65 and 67 are coupled to each other and to the double plunger system 69 in the same manner as the hybrids and plunger system in power divider 11. The double plunger system 69 is similar to that described above in connection with double plunger system 23. When the plungers 69a and 69b in system 69 are in their centered position, all of the received signal wave power from coupler 39 at terminal 67a of the hybrid is coupled out of terminal 61b of hybrid 61 to receiver $Rx_2$. Under the same conditions, the total power from coupler 39 at input terminal 67b is coupled out of terminal 61a of hybrid 61 to receiver $Rx_1$. The input terminal of hybrid 67a is coupled via duplexer 35 to the terminal 38 of orthogonal coupler 39. The terminal 67b of hybrid 67 is coupled via duplexer 41 and 90° rotator 37 to terminal 40 of orthogonal coupler 39.

If, for example, the transmitters are arranged to transmit at 6 GHz and the receivers at about 4 GHz, separation of the transmit and receive signals is provided by the duplexers 35 and 41 arranged to separate or combine these frequencies. Isolation between the terminals 35a and 35b of the duplexer 35 may be provided by filters which pass at terminal 35a only those signals within the transmit frequency band of about 6 GHz and to pass at terminal 35b only those signals at 4 GHz. Those signals at both 4 and 6 GHz are passed through the third terminal 35c of duplexer 35. Similarly, the duplexer 41 is arranged such that the terminal 41a of duplexer 41 only passes signals at about 6 GHz and that terminal 41b is arranged so as to pass only signals at about 4 GHz. Signals at both the 4 and 6 GHz frequency bands are coupled through terminal 41c of the duplexer 41.

The received signals at 4 GHz with horizontal polarization coupled to horn 45 and to orthogonal coupler 39 are coupled out of terminal 40 of the coupler 39, are rotated 90° through rotator 37 and coupled through duplexer 41 to terminal 67b of the hybrid 67. Similarly, those signals with vertical polarization at 4 GHz coupled to the horn 45 are coupled through terminal 38 of orthogonal coupler 39 to duplexer 35. The received signals due to their frequency are coupled out of terminal 35b of duplexer 35 to terminal 67a of hybrid 67. By adjustment of the plungers 69a and 69b in adjustable double plunger system 69, the power division can be selected between the inputs at 67a and 67b so that maximum power from one polarized wave at the receiver frequency band is coupled to one of the receiver terminals such as $Rx_1$, for example, and maximum power from the orthogonally polarized receive wave is coupled to the other receiver terminal $Rx_2$, for example. The attitude transmit and receive signal waves may therefore be independently rotated by independent adjustment of the plunger systems 23 and 69.

In the arrangement described above, the attitude of both transmitted waves may be rotated slightly such as +1.5° for the example illustrated in FIG. 2 to correct for up-link rotation due to the propagating media. By changing the position of the plungers periodically with sensed changes in the media, the propagating media effects can be minimized. Similarly, the polarization attitude for the receives waves can be rotated slightly such as −2.2° for example to correct for down-link polarization attitude changes due to Faraday rotation. When the propagating media changes occur the transmit and receive wave polarization may be corrected independently by changing the position of the double plungers in adjustable plunger systems 23 and 69.

Figure 6:
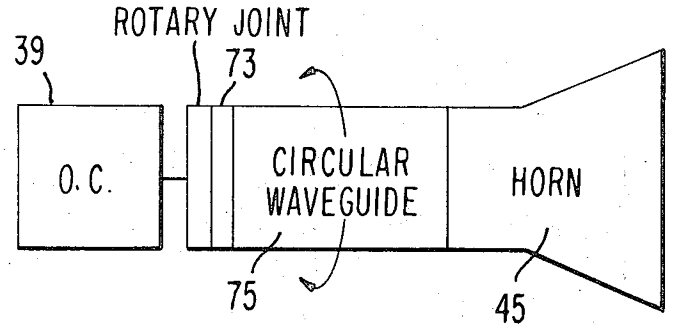
FIG. 6 is a block diagram of a portion of the rotatable polarization system with a rotary joint and circular waveguide section added for initial alignment of linear polarized waves.

In the case of a linear polarized system, the initial alignment of the two orthogonal linear polarized signals is achieved by aligning the orientation of the vertical and horizontal waves with that of the satellite antenna. This may be done by the combination of a rotary joint 73 and a circular waveguide 75 as shown in FIG. 6. The output of the rotary joint is coupled to the horn 45. The horn 45 and circular waveguide remain fixed and the rest of the system is rotated at the rotary joint 73 to permit initial linear orientation of the waves to be matched with that from the satellite. When media changes occur, correction is achieved for the transmitters by movement of plungers 25a and 26a and for the receivers by movement of plungers 69a and 69b.

Figure 7:
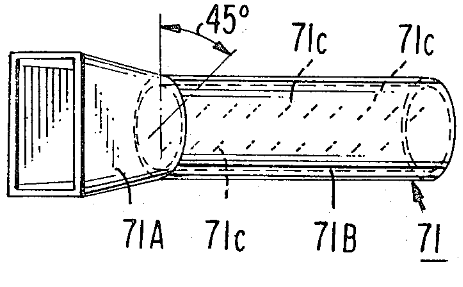
FIG. 7 is a perspective view of a linear wave to circular or elliptical wave polarizer.

Referring to FIG. 3, if between the horn 45 and the orthogonal coupler 39 is placed a linear to circular fixed polarizer 71, the fixed polarizer 71 converts the vertical or horizontal linear polarized waves at the orthogonal coupler 39 into either right or left circular polarized waves. The two transmitted signals and the two received signals achieve separation on the basis of being right or left circular polarized waves. Referring to FIG. 7, this fixed polarizer 71 may be made up of a square to circular waveguide junction section 71a if the output from coupler 39 is square waveguide and by a circular waveguide section 71b having pins 71c at an angle of 45° with respect to a vertical polarized signal. See FIG. 7. This polarizer in response to the horizontal or vertical polarized waves provides right or left circular polarized waves at the output. Such a system can be used for a dual-frequency band, dual-circularly polarized spectrum reuse antenna system with independently adjustable axial ratios for the circular polarizations in the receive and transmit frequency bands. For central location of the plungers 25a and 26a and 45° plane location of the polarizer pins 71c essentially unity axial ratio occurs for both right and left circular polarizations. By movement of the transmit band plungers 25*a* and 26*a* and a corresponding location of the polarizer pins 71*c*, the transmit band axial ratio can remain unchanged. By such rotation of the polarizer pins 71*c* an adjustment of the receiver band plunger, any polarization ellipse for the received band can be obtained. Since the output signal from a satellite, for example, may not be a pure circular polarized signal but may have some ellipticity it is desirable that the receiver match this elliptical wave. This is accomplished by rotating the polarizer pins 71*c* and adjustment of the receiver plungers 69*a* and 69*b* so that the receiver input matches the polarization ellipse from the satellite antenna. By movement of the transmit band plungers 25*a* and 26*a* relative to the moved position of the polarizer 71*c*, the transmitter axial ratio is adjusted to achieve the desired polarized wave from the transmitter. If the axial ratio desired is unity that can be made adjustable by movement of the plungers 25*a* and 26*a* to do so but in any case movement of the polarizer pins 71*c* to adjust the receiver polarization requires readjustment of the plungers 25*a* and 26*a* to achieve the same transmit polarized wave.

What is claimed is:

1. In an antenna feed system for coupling radio frequency waves from two sources of linearly polarized waves at a first frequency band to a radiating means and for coupling a pair of orthogonally positioned linearly polarized signal waves at a second frequency band from said radiating means to a pair of receiver loads, the combination comprising:

first and second transmitter terminals each adapted to be coupled to a separate source of linearly polarized radio waves;

first and second receiver terminals each adapted to be coupled to a separate receiver load;

an orthogonal coupler having three coupling terminals, the first coupling terminal adapted to pass linearly polarized waves of a first orientation, the second coupling terminal adapted to pass linearly polarized waves of a second orientation orthogonal to said first orientation, and a third coupling terminal adapted to pass waves polarized at either of said first and second orientations or at orientations the vectorial sum of said first and second orientation;

adjustable power dividing means coupled to said first and second transmitter terminals and responsive to first linearly polarized waves from said first and second transmitter sources for power dividing the waves from said first and second sources according to selected power ratios to provide first power divided waves at a first given ratio of power from said first source at first and second power divider outputs respectively and to provide second power divided waves at a second selected ratio of power being the reciprocal of said given ratio at said first and second power divider outputs respectively;

first and second duplexers each adapted to pass signals within both first and second frequency bands at a multiple frequency band coupling terminal, to pass signals only within said first frequency band at a first frequency band coupling terminal and to pass signals only within said second frequency band at a second frequency band coupling terminal;

said first duplexer coupled at said multiple band coupling terminal to the first coupling terminal of said orthogonal coupler and said second duplexer coupled at said multiple band coupling terminal to said second coupling terminal of said orthogonal coupler whereby said orthogonally positioned waves at said second frequency band from said radiating means are converted to third and fourth power divided waves representative of the horizontal and vertical components of said orthogonally positioned waves and said third and fourth power divided waves are coupled to said second frequency band coupling terminal of said first and second duplexers respectively; said first frequency band coupling terminal of said first duplexer coupled to said first power divider output of said adjustable power divider and said first frequency band coupling terminal of said second duplexer coupled to said second power divider output terminal of said adjustable power divider whereby in response to said power divider waves at said first and second ratios of power at said power divider outputs, two resultant linearly polarized waves of selected orthogonal orentation are transmitted through the third terminal of said orthogonal coupler, means coupled to said power dividing means for adjusting said power ratios to alter the orientations of said two resultant linearly polarized waves equally to maintain orthogonal relationship;

adjustable power combiner means including a tunable phase shifting means coupled between said first and second receiver terminals and said second frequency band coupling terminal of said first and second duplexer and responsive to said third and fourth power divided waves at said second frequency band for coupling maximum power from one of said orthogonally positioned linearly polarized waves at a given orientation out of said first receiver terminal and maximum power from the other orthogonally polarized received waves out of the second receiver terminal; and means for independently adjusting the tuned position of said phase shifting means depending on the orientation of said orthogonally positioned linearly polarized waves from said radiating means to couple maximum power from any one of the received orthogonally positioned waves from the radiating means out of said first receiver terminal and maximum power from the other orthogonally positioned waves from the radiating means out of said second receiver terminal.

2. The combination as claimed in claim 1 wherein said adjustable power dividing means includes a power divider for power dividing applied signal waves and tunable phase shifting means for adjusting the relative phase between power divided signal waves.

3. The combination as claimed in claim 2 wherein said adjustable power combiner includes a second power divider.

4. The combination as claimed in claim 3 wherein said third coupling terminal of said orthogonal coupler is coupled to a fixed polarizer for converting linearly polarized waves of a given orientation to right circularly polarized waves and for converting the orthogonal linearly polarized waves into left circularly polarized waves.

5. The combination as claimed in claim 3 wherein said third coupling terminal of said orthogonal coupler is coupled to a rotatable polarizer for translating linearly polarized waves of a first orientation at the orthogonal coupler to elliptically polarized waves of a first characteristic polarization out of the polarizer and for translating linearly polarized waves of a second orthogonal polarization at the orthogonal coupler to an elliptically polarized wave of a different orthogonal polarization to said first orientation out of the polarizer, said orientation and axial ratio of the polarization ellipse being determined by the selected relative phase shift provided by said first tunable phase shifting means and by the rotation of a polarizer.

6. An adjustable power divider for providing power division of signal waves from a first transmitter source at a first given ratio and for providing power division of signal waves from a second transmitter source at a ratio the reciprocal of said given ratio comprising in combination:

four quadrature hybrids each having a pair of terminals at each end, said hybrids adapted to provide in response to signals at one of said terminals at one end substantially equal half powered signals at the pair of terminals at the opposite end with 90° relative phase shift between the half powered signals, a double plunger system including first and second waveguides and a separate plunger slidably mounted within each of said waveguides adapted to present an adjustable reflecting short at either end of said waveguides, the first of said hybrids having first and second terminals at one end thereof coupled respectively to one end of said first and second waveguides, the second of said hybrids having first and second terminals at one end thereof coupled respectively to the unconnected end of said first and second waveguides, the third of said hybrids having at one end thereof first and second terminals adapted to be coupled to first and second transmitter sources respectively, said third hybrid having a third opposite terminal coupled to the third terminal of said first hybrid and said third hybrid having a fourth terminal coupled to the third terminal of said second hybrid, and the fourth of said hybrids coupled at one end at first and second terminals to the fourth remaining terminals of said first and second hybrids respectively whereby by selectively moved positions of said plungers the signal waves from said first source are power divided and coupled out of said third and fourth terminals of said fourth hybrid at a given power ratio and the signal waves from said second source are power divided and coupled out of said third and fourth terminal of said fourth hybrid at a power ratio the reciprocal of said given power ratio.

7. The combination as claimed in claim 6 wherein said hybrids are short slot hybrids.

8. The combination as claimed in claim 6 wherein said plungers are coupled together to move together.

9. In an antenna feed system for coupling linearly polarized radio waves at a given power level between a source and a radiating means, the improvement comprising:

an adjustable power dividing means including first and second hybrid junctions, a pair of transmission lines coupled therebetween and means for varying the electrical length of said transmission lines, said adjustable power dividing means responsive to said linearly polarized waves from said source for power dividing said waves to provide said linearly polarized waves at a first power level being a selected percentage of said given power level at a first power divider output and said linearly polarized waves at a second power level being a remaining percentage of said given power level at a second power divider output, and an orthogonal coupler coupled to said first power divider output of said adjustable power dividing means and responsive to said waves coupled thereto for exciting first linearly polarized output waves at a first polarization and at said first power level and coupled to said second power divider output of said adjustable power dividing means and responsive to said waves coupled thereto for exciting second linearly polarized output waves at a polarization orthogonal to said first polarization and at said second power level and for producing at the output of said coupler third linearly polarized output waves polarized according to the vectorial sum of said excited first and second waves, said means for varying the electrical length of said pair of transmission linear including a pair of waveguide sections having reflective plungers in each section whereby movement of said plungers adjusts the percentage of power at said first and second power divider outputs for causing adjustment of the polarization of said third linearly polarized output waves.

10. In an antenna feed system adapted to transmit a pair of orthogonally polarized transmit signals comprising, orthogonal coupling means having first and second energy inducing and pickup means which are orthogonally related, a quadrature hybrid having a pair of input terminals and a pair of output terminals, responsive to a first transmit signal applied to the first input terminal for splitting said signal into components that are at phase quadrature at the first and second output terminals and responsive to a second transmit signal applied to the second input terminal for splitting said second signal into components that are at phase quadrature at the first and second output terminals, means including first and second transmission paths coupled to said first and second output terminals respectively of said quadrature hybrid for coupling said first and second components of said first and second signals to said first and second orthogonally related energy inducing and pickup means in a manner to in response to said first transmit signals at said first input terminal of said quadrature hybrid excite first waves of a first polarization in said orthogonal coupling means and in response to said second transmit signals at said second input terminal of said quadrature hybrid excite second waves polarized orthogonal to said first waves in said orthogonal coupling means, the improvement therewith comprising:

unitary means coupled to said first and second transmission paths for selectively increasing or decreasing the electrical length of said first transmission path from a first given electrical length while causing an equal but opposite change in the electrical length of said second transmission path, whereby the polarization of said first and second waves are changed while maintaining their orthogonal relationship.

11. The combination claimed in claim 10, wherein said unitary means includes a pair of waveguide sections with reflecting plungers in each of said sections.

* * * * *